United States Patent

Byler et al.

[11] Patent Number: 5,241,936
[45] Date of Patent: Sep. 7, 1993

[54] FOOT PEDAL ARRANGEMENT FOR ELECTRONIC THROTTLE CONTROL OF TRUCK ENGINES

[75] Inventors: Jay D. Byler, Beaverton; James G. Honyak, Keizer, both of Oreg.

[73] Assignee: Williams Controls, Inc., Portland, Oreg.

[21] Appl. No.: 756,430

[22] Filed: Sep. 9, 1991

[51] Int. Cl.⁵ .............................................. F02D 11/10
[52] U.S. Cl. ........................................ 123/399; 74/513; 180/335
[58] Field of Search .......................... 123/399; 74/513; 180/335

[56] References Cited

U.S. PATENT DOCUMENTS

| | | | |
|---|---|---|---|
| 4,831,985 | 5/1989 | Mabee et al. | 123/399 |
| 4,944,269 | 7/1990 | Imoehl | 123/399 |
| 4,958,607 | 9/1990 | Lundberg | 123/399 |

Primary Examiner—Andrew M. Dolinar
Attorney, Agent, or Firm—Robert L. Harrington

[57] ABSTRACT

An accelerator foot pedal suspended from a support structure affixed to the front wall of a vehicle cab, a drum at the proximal end of the foot pedal defining, with the support structure, an enclosure which houses an internal rack-and-pinion gearing. A sensor mounted to the support structure generates a control signal representing the angular position of the foot pedal, the rack and pinion translating rotational movement of the foot pedal to an input of the sensor.

12 Claims, 2 Drawing Sheets

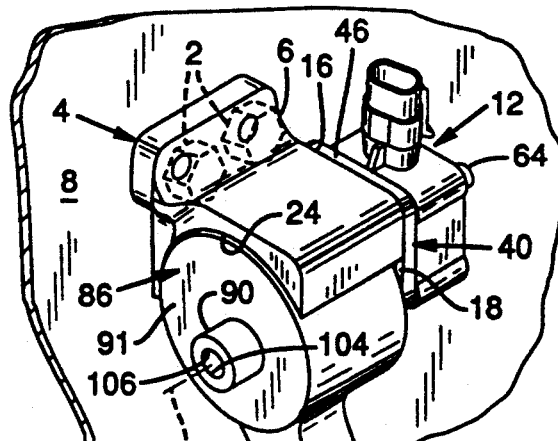
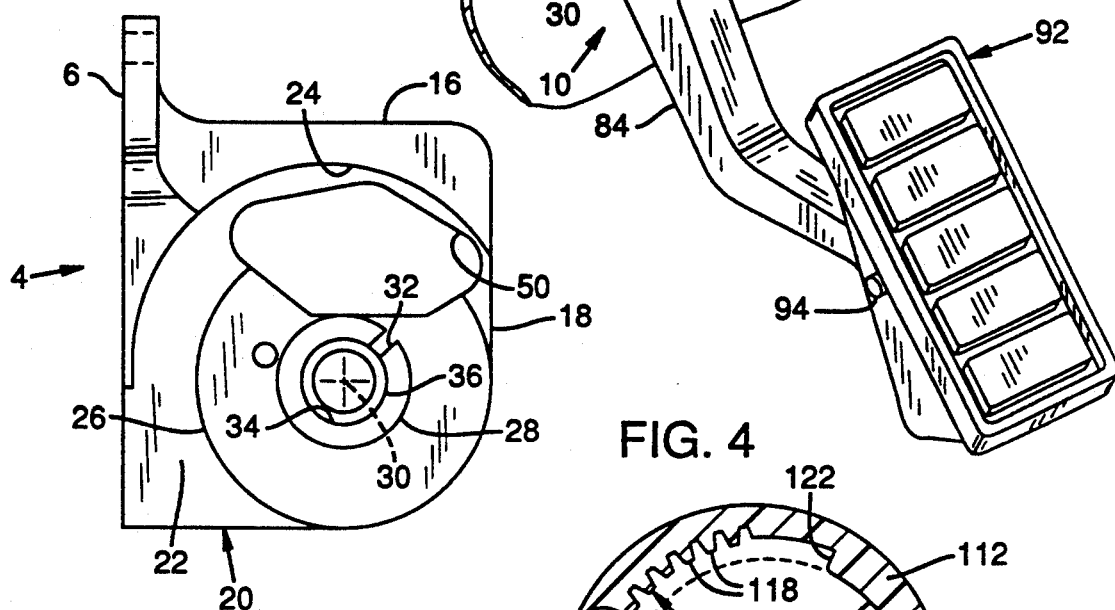
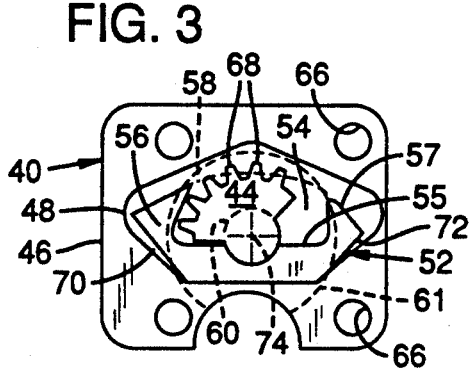
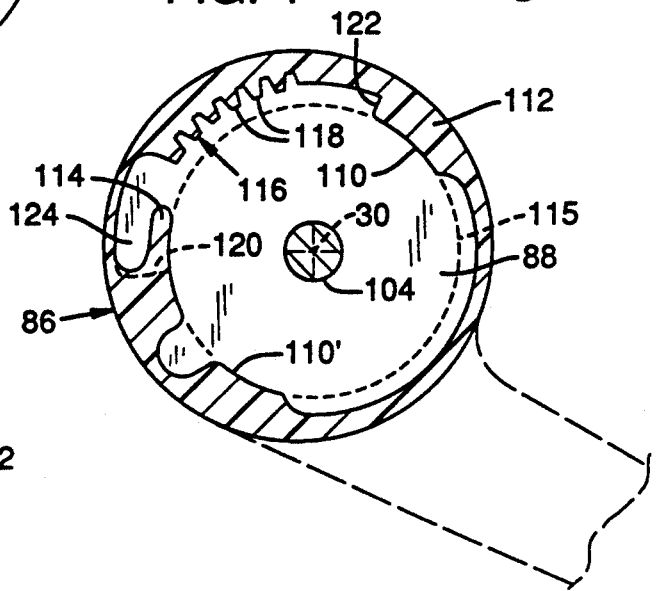

FOOT PEDAL ARRANGEMENT FOR ELECTRONIC THROTTLE CONTROL OF TRUCK ENGINES

BACKGROUND OF THE INVENTION

This invention relates generally to controls, and more particularly to a foot pedal control coupled to a fuel dispensing system of an internal-combustion engine.

Actuation of a foot pedal coupled to a fuel dispensing system of an engine alters the output of fuel discharged by the fuel dispensing system. Conventionally, the unactuated foot pedal is held in a home or idle position by a spring arrangement, and the operator, by depressing the pedal causes an increase of the fuel output from the fuel dispensing system, thereby increasing engine RPM and/or power output of the engine.

An important feature of diesel engines as well as many spark-ignition engines is the fuel-injection system, consisting of pumps that meter and place the fuel under injection pressure, the injection nozzles and the governing controls. Controlling the rate of fuel dispensed to the cylinders of an internal combustion engine, commonly referred to as throttle control, is accomplished in a fuel-injection system by adjusting the output of a fuel pump or a system of fuel pumps that supply the cylinders. Fuel controls have evolved from mechanical linkages coupling a foot pedal to a control rack of a fuel pump system, to an electronic linkage coupling the foot pedal to a computer, the computer monitoring, inter alia, a sensor that detects incremental movement of the foot pedal, and responsive to such detected movement and other input data, controlling the output of the fuel pump system.

Many modern internal-combustion engines are computer controlled. For example, a fuel pump system is suitably operated by one or more servomechanisms responsive to control signals from a computer, which monitors an input signal provided by a sensor coupled to the foot pedal. The foot-pedal sensor, suitably a potentiometer, is actuated in response to depression of the foot pedal by the operator of the vehicle. The computer thus controls fuel flow to the engine, generating appropriate control signals in response to monitored input signals from the foot-pedal potentiometer as well as other input signals from sensors which detect both internal and external engine operating parameters such as temperature, humidity, barometric pressure, engine RPM and load, etc., providing increased engine efficiency, fuel economy and reduced emission of pollutants to the atmosphere.

An early design of an electronic control system located the movement detecting sensor in the engine compartment near the fuel pump; however, this arrangement proved undesirable due to the complex mechanical linkage required to connect the foot pedal to the sensor. Moreover, the harsh operating environment of the engine compartment exposed the sensor to heat, oil and dirt, which can contribute to premature failure of sensitive components. Subsequent designs thus located the sensor in the cab or operator compartment, the sensor being incorporated in a foot pedal arrangement that included a means for providing rotative motion of a potentiometer in response to depression of the foot pedal. A foot pedal, its support structure, sensors such as a potentiometer and the various interconnecting components are collectively 10 referred to herein as a "foot pedal arrangement". One such implementation shown in U.S. Pat. No. 4,958,607, which is assigned to the same assignee as the instant invention, provides a suspended pedal configuration, which is a desirable arrangement; however, many of the mechanical elements are disposed exteriorly on the support structure, and the pivot of the foot pedal is spaced apart from the front wall farther than desirable in the limited space of the truck cab. Particularly, the foot-pedal pivot is situated relatively far from the front wall of truck cab, well beyond the pivot of the potentiometer actuating mechanism. It is desirable to locate the pivot point of the foot pedal as close to the front wall as possible in order to conserve space in the often cramped confines of a truck cab. Further, in the '607 arrangement, torque was applied by coil springs to the shaft that actuated the potentiometer, consequently the coil springs were required to rotate through the same arc as the potentiometer shaft, resulting in a pedal pressure differential from idle to full throttle that was higher than desirable for optimum operator comfort.

It is therefore a principal object of the present invention to provide a improved foot pedal arrangement.

A more specific object of the present invention is to provide a foot pedal arrangement with improved pedal pressure differential.

Another object of the instant invention is to provide an improved foot pedal arrangement which locates the pivot of the foot pedal close to the front wall of the truck cab.

It is another object of the present invention to provide an improved foot pedal arrangement requiring reduced force to hold the pedal actuated, thereby increasing operator comfort.

Another object of the invention is to provide an improved compact foot pedal arrangement with an aesthetically pleasing, uncluttered appearance, and having fewer moving components virtually all of which are internally disposed for safer operation and for protection from dirt and contaminants.

SUMMARY OF THE INVENTION

The present invention utilizes a sensor to generate a signal representative of foot-pedal depression, which is monitored by a computer. The unique arrangement of the components and the means for translating rotary motion of the foot pedal to the input of the sensor allows mounting the pedal closer to the front wall of the truck cab than wa possible in previous arrangements.

A support structure provides a housing in which the pivot of a suspended foot pedal is journaled, and on which a sensor is mounted. The housing, and a pivotally mounted cylindrical drum of the foot pedal conjoined with the housing, provide an enclosure containing a spring which applies rotative resistant bias to the foot pedal, and interconnecting elements which translate pedal movement into sensor input. An internal gear defined on the annular rim of the foot-pedal drum meshes with a pinion having an axial shaft journaled in the housing, the shaft providing input to the sensor, thereby translating foot-pedal movement into sensor output.

BRIEF DESCRIPTION OF THE DRAWING

While the invention is set forth with particularity in the appended claims, other objects, features, the organization and method of operation of the invention will become more apparent, and the invention will best be understood by referring to the following detailed description in conjunction with the accompanying drawing in which:

FIG. 1 is a perspective view of a foot pedal arrangement in accordance with the present invention;

FIG. 2 is a side view of the support structure of the foot pedal arrangement in accordance with the invention;

FIG. 3 is a plan view of the pinion bearing/lever stop element of the foot pedal arrangement;

FIG. 4 is a section view, taken near its open end, of the foot-pedal drum according to the present invention.

DESCRIPTION OF THE PREFERRED EMBODIMENT

Figure 5:
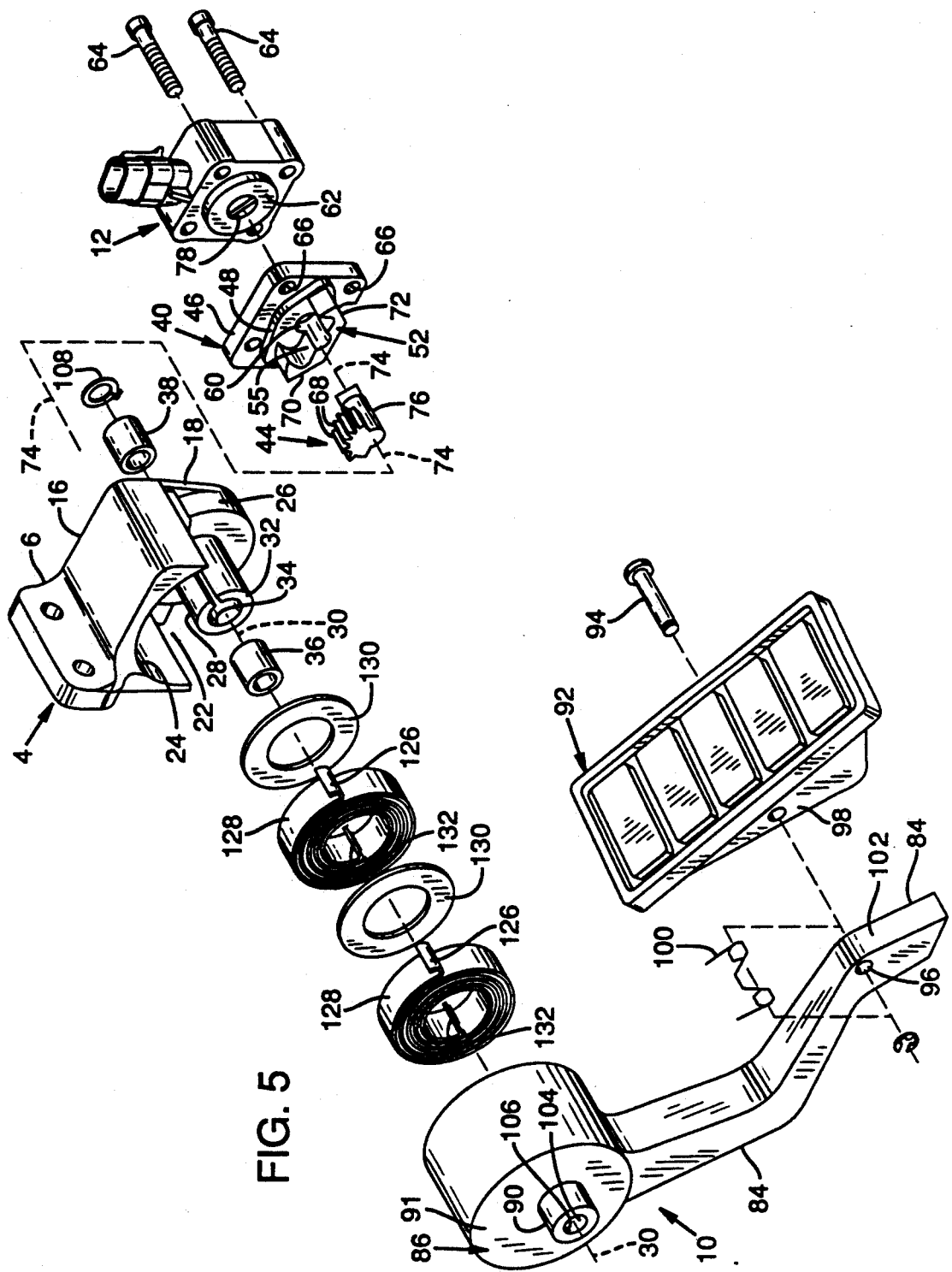
FIG. 5 is an exploded perspective view, partially cut away, illustrating the various components of the foot pedal arrangement of FIGS. 1 through 4.

Referring now to the various views of the drawing for a more detailed description of the components, materials, construction, function, operation and other features of the instant invention by characters of reference, a foot pedal assembly 10 incorporates a support structure 4, which is suitably machined or die cast from aluminum, and which includes a base plate 6 configured to be mounted and rigidly attached to a front wall 8 of a cab of a diesel engine powered truck, e.g., by bolts 2 (shown in dash line). The features and configuration of the support structure 4, described in detail below, provide support for a foot-pedal assembly 10, a potentiometer 12 and internal interconnecting elements that translate foot-pedal movement into rotational movement of the potentiometer shaft.

Top wall 16 and side wall 18 elements of the support structure 4 extend outwardly from the base plate 6, and with the base plate 6 define a housing 20 open on one side and having a formed recess 22 with a cylindriform interior surface 24. Interiorly of the housing 20, a cylindrical boss 26 and a cylindrical sleeve 28 having a common axis 30 with the boss 26 extend into the recess 22 from the closed side wall 18. A longitudinal groove 32 defined in the periphery of the sleeve 28 extends the length thereof, and a common central bore 34 extends through the sleeve 28, the boss 26 and the side wall 18. A needle bearing 36 is pressed into the bore 34 at the distal end of the sleeve 28, while a second needle bearing 38 is pressed into the opposite end of the bore 34 from the side wall 18.

A pinion bearing/lever stop element 40, suitably machined or die cast from aluminum, is adapted to be fastened to the side wall 1 of the housing 20 and provides a mounting means for the potentiometer 12 exteriorly of the housing 20, a seat inside the housing 20 for a pinion 44, and interconnection between the pinion 44 and potentiometer 12, later described. The pinion bearing/lever stop element 40 comprises a mounting pad 46 adapted for attachment outside the side wall 18 of the housing 20, the pad 46 being positioned with respect to the side wall 18 by an irregularly shaped locating boss or dowel 48 extending from the pad 46 into an aperture 50 machined or die cast in the side wall 18, the boss 48 having essentially the same thickness as the side wall 18 and being received closely in the aperture 50, which has essentially the same shape as the boss 48 such that the boss forms a closure of the side wall aperture 50. Extending into the housing 20 from the boss 48 and integral with the element 40, a configured pillow block 52 provides a seat for the pinion 44 in a generally cylindriform recess 54 defined in the block 52. The recess 54 is defined by a platform or base 55 and upwardly extending ears 56, 57 interiorly contoured in cylindrical form commensurate with the shape of the pinion 44. Top surfaces of the ears 56, 57 define an arc (designated in FIG. 3 by dashed line 58) concentric with the axis 30. A bore 60 laterally intersects the base 55 and extends through the boss 48 and pad 46. A counterbore 61 defined exteriorly in the pad 46 coaxially with the bore 60 receives cylindrical protrusion 62 of the potentiometer 12, the potentiometer being attached to the side wall 18 by suitable fasteners 64 extending through apertures 66 in the pad 46.

The pinion 44, which seats rotatably inside the recess 54, is formed with peripheral gear teeth 68, six in the presently described embodiment of the invention, that subtend an angle of approximately 135 degrees about an axis 74 of the pinion; an axial shaft 76 of the pinion 44 extends through the bore 60 and engages an input shaft 78 of the potentiometer 12. The pinion 44 is suitably formed from a rigid polymeric material such as glass reinforced nylon. The configuration of the recess 54 allows a rotational throw of about 55 degrees of the pinion 44 seated therein. The pinion gear teeth 68, as they rotate through a position normal to the platform 55, project below the arc 58. Bearing surfaces 70, 72 defined at either end of the configured block 52 beneath the ears 56, 57 provide lever stops which limit rotational movement of the foot pedal as described hereinafter.

The foot-pedal assembly 10 includes a drive lever 84 extending from and affixed at its proximal end to a configured drum 86, which is in the shape of cylinder normal to the drive lever 84 and open at one end to a cavity 88. A hub 90 formed at the closed end 91 of the drum 86 is eccentric with respect to the cylindrical periphery of the hub. The drive lever 84 and drum 86 are suitably formed as a unitary element from a rigid polymeric material such as glass reinforced nylon. A conventional pedal 92 is pivotally attached to the drive lever 84 by a pin 94 extending through an aperture 96 in the lever 84 and a clevis 98 on the underside of the pedal. A spring 100 urges the pedal against an angled landing 102 on the lever 84. A pivot 104, which is affixed to the hub 90 as by pressing into an aperture 106, projects into the cavity 88 such that when the drum 86 is inserted into the formed recess 22 of the housing 20 the pivot 104 slides into the central bore 34 and is journaled in the needle bearings 36, 38, thus providing pivotal motion of the pedal drive lever 84 and drum 86 about the pivot 104 and the axis 30. The pivot 104 is axially retained in the housing 20 by a snap ring 108.

The drum 86 and housing 20 conjoined form an enclosure, the drum 86 and the housing 20 each closing the other, which encloses and protect the internal interconnecting elements that translate rotative foot-pedal movement into rotational movement of the potentiometer shaft 78. Although the periphery of the drum 86 is circular and conforms generally with the cylindriform interior surface 24 of the housing 20, the drum rotates eccentrically with respect to the surface 24 because of the eccentricity of the axis 30 with respect to the periphery of the drum 86. However (see FIG. 4), the cavity 88, defined by internally projecting nubs 110, 110' of cylindrical wall 112 of the drum 86 and the internal surface of a lobe 114 is configured concentrically (as indicated in FIG. 4 by dashed line 115) with the pivot 104 about the axis 30, so as to loosely and slidably envelop the boss 26 of the support structure 4, when the drum 86 and housing 20 are conjoined.

A rack 116 having six gear teeth 118 defined integrally in the wall 112 of the drum 86 interiorly and concentrically with the pivot 104 meshes with gear teeth 68 of the pinion 44. Rotation of the drum 8 about the pivot is limited by engagement of radial limit stops 120, 122, respectively, against bearing surfaces 70, 72 of the pillow block 52. The lobe 114 defines a slot 124 Open to the cavity 88 of the drum 86. The slot 124 extends substantially the depth of the drum beyond the radial limit stop 120 and is configured to receive external catches 126 of a pair of coil springs 12 disposed inside the cavity 88 of the drum 86 when the foot-pedal assembly and the support structure 4 are conjoined. Washers 130 separate the springs from each other and from the face of the pillow block 52. Internal catches 132 of the springs 128 are inserted into the longitudinal groove 32 of the sleeve 28. The springs 128 installed under tension apply torque to the drum 86 in a counterclockwise direction with reference to FIG. 4, the rotation of the drum 86 being checked by engagement of the limit stop 122 against bearing surface 72 of the pillow block 52; in such position of the drum 86, the foot pedal, under spring pressure or bias, is said to be in a home or idle position. Likewise the pinion 44 (as shown in FIG. 3) and the potentiometer shaft, which is coupled by way of the rack-and-pinion gearing arrangement to the foot pedal, are in the home position.

In operation, the foot pedal 92 is depressed moving the foot pedal from the home position, pivoting the drum 86 about the axis 30, clockwise with reference to FIG. 4. As the rack 116 rotates clockwise through a predetermined arc, the pinion 44 rotates, the shaft of which in turn rotates the potentiometer 12. Rotation of the drum 86 continues as the foot pedal is further depressed until the radial limit stop 120 engages the lever stop 70 of the pillow block 52. A computer 134 coupled to the potentiometer 12 by a bus 136 periodically monitors the output signal of the potentiometer, detecting incremental movement of the foot pedal, and generates appropriate control signals for controlling fuel flow to the engine, based in part on foot-pedal position. The degree of rotation between the limit stops 120, 122 is determined by the rotational specifications of the potentiometer in ranging from minimum to maximum output signal value. In the presently described embodiment of the invention, the potentiometer rotates 53 degrees, while the foot-pedal drive lever pivots approximately 20 degrees. The torque springs 128 act directly on the foot-pedal drum applying resistant force to the element having the lesser degree of rotation, the force differential between home position or idle and full throttle being therefore substantially reduced to approximately 10 pounds.

The foot pedal arrangement can be reconfigured to provide for sensors having different rotational requirements, or to provide greater or lesser rotational movement of the foot pedal. For example, decreasing the gear ratio between the rack and the pinion by decreasing the radius of the rack 116 without altering the radius of the pinion 44 would increase the rotational throw of the pot, while increasing the radius of the pinion would decrease the rotational throw of the potentiometer. Reconfiguring the limit stops changes the rotational throw of both the foot pedal and the potentiometer at the same ratio of movement.

The rack 116 of the rack-and-pinion gearing is an internal gear, which facilitates locating the axis 74 of the pinion 44 proximate to the pivot of the foot pedal. Translation of foot-pedal rotative motion to potentiometer rotation by way of such internally disposed gearing allows placement of the foot-pedal assembly much closer to the front wall of the vehicle than was possible with earlier foot pedal arrangements, the drum 86 being adjacent to the front wall 8; such arrangement further provides a compact, uncluttered structure. The rack-and-pinion arrangement is, therefore, a bi-directional coupling between the sensor and the foot pedal for driving the sensor in an appropriate direction and magnitude of angular rotation in response to corresponding movement of the foot pedal. Thus, the rack-and-pinion arrangement drives the sensor in both directions.

While the principles of the invention have now been made clear in the foregoing illustrative embodiment, there will be immediately obvious to those skilled in the art many modifications of structure, arrangement, proportions, the elements, material and components used in the practice of the invention, and otherwise, which are particularly adapted for specific environments and operating requirements without departing from those principles. The appended claims are, therefore, intended to cover and embrace any such modifications, within the limits only of the true spirit and scope of the invention.

We claim:

1. In a throttle control system of a vehicle having an internal combustion engine and a throttle controlling computer, a foot pedal arrangement providing input to the throttle controlling computer and including a support structure adapted for mounting onto an upright wall of a vehicle cab, a foot pedal suspended from the support structure and having a pivot journaled to the support structure, sensor means mounted to the support structure for generating a control signal representative of the angular position of the foot pedal, the throttle controlling computer coupled to the sensor means whereby the control signal generated by the sensor means is monitored by the computer for controlling the engine throttle, and means for translating pivotal movement of the foot pedal to an input of the sensor means, the improvement comprising:

the foot pedal and the support structure being conjoined to define an enclosure containing the journaled pivot and the pivotal movement translating means, the pivotal movement translating means moving said sensor input through a first range of angular movement in response to movement of said foot pedal through a second range of angular movement, the first range of angular movement being greater than the second range of angular movement.

2. The foot pedal arrangement of claim 1 wherein the enclosure contains a spring intermediate the foot pedal and the support structure, the spring applying a spring bias to the foot pedal with respect to the support structure.

3. The foot pedal arrangement of claim 2 wherein the spring is a coil spring coaxial with the pivot of the foot pedal.

4. In a throttle control system of a vehicle having an internal combustion engine and a throttle controlling computer, a foot pedal arrangement providing input to the throttle controlling computer and including a support structure adapted for mounting onto an upright wall of a vehicle cab, a foot pedal suspended from the support structure and having a pivot journaled to the support structure, sensor means mounted to the support structure for generating a control signal representative of the angular position of the foot pedal, the throttle controlling computer coupled to the sensor means whereby the control signal generated by the sensor means is monitored by the computer for controlling the engine throttle, and means for translating pivotal movement of the foot pedal to an input of the sensor means, the improvement comprising:

the pivotal movement translating means comprising a rack-and-pinion gearing.

5. The foot pedal arrangement of claim 4 wherein the rack-and-pinion gearing comprises a rack integral with the foot pedal and concentric with the pivot, and a pinion coupled to the input of the sensor means, the pinion being journaled to the support structure.

6. The foot pedal arrangement of claim 4 wherein the rack of the rack-and-pinion gearing is an internal gear interiorly disposed in the support structure.

7. In a throttle control system of a vehicle having an internal combustion engine and a throttle controlling computer, a foot pedal arrangement providing input to the throttle controlling computer, the foot pedal arrangement comprising:

a support structure having a base for mounting onto an upright wall of a vehicle cab, the support structure having an open cylindriform housing with a side wall;

a foot-pedal assembly pivotally suspended from the support structure and including a drive lever, a pedal at a distal end of the drive lever, a drum having an open end and a closed end and conforming generally with the shape of the open cylindriform housing, and a pivot axially disposed in the drum and affixed to the closed end of the drum, the pivot being journaled in the support structure such that the drum and the housing conjoined form an enclosure, the drum and the housing each closing the other;

sensor means mounted on the support structure for generating a control signal representing an angular position of the drive lever of the foot-pedal assembly, the throttle controlling computer coupled to the sensor means whereby the control signal generated by the sensor means is monitored by the computer for controlling the engine throttle; and means disposed inside the enclosure for translating pivotal movement of the foot-pedal assembly to an input of the sensor means, the pivotal movement translating means being coupled to and responsive to rotation of said drum by causing corresponding rotation of said sensor input, the pivotal movement translating means moving said sensor input through a first range of angular movement in response to movement of said foot pedal through a second range of angular movement, the first range of angular movement being greater than the second range of angular movement.

8. In a throttle control system of a vehicle having an internal combustion engine and a throttle controlling computer, a foot pedal arrangement providing input to the throttle controlling computer and including a support structure adapted for mounting onto an upright wall of a vehicle cab, a foot pedal suspended from the support structure and having a pivot journaled to the support structure, sensor means mounted to the support structure for generating a control signal representative of the angular position of the foot pedal, the throttle controlling computer coupled to the sensor means whereby the control signal generated by the sensor means is monitored by the computer for controlling the engine throttle, and means for translating pivotal movement of the foot pedal to an input of the sensor means, the improvement comprising:

the foot pedal and the support structure being conjoined to define an enclosure containing the journaled pivot and the pivotal movement translating means, the pivotal movement translating means comprising of rack-and-pinion gearing.

9. The foot pedal arrangement of claim 8 wherein the rack-and-pinion gearing comprises a rack integral with the foot pedal and concentric with the pivot, and a pinion having a shaft journaled to the support structure and coupled to the input of the sensor means.

10. In a throttle control system of a vehicle having an internal combustion engine and a throttle controlling computer, a foot pedal arrangement providing input to the throttle controlling computer, the foot pedal arrangement comprising:

a support structure having a base for mounting onto an upright wall of a vehicle cab, the support structure having an open cylindriform housing with a side wall;

a foot-pedal assembly pivotally suspended from the support structure and including a drive lever, a pedal at a distal end of thereof, the drum having an open end and a closed end and conforming generally with the shape of the open cylindriform housing, and pivot axially disposed in the drum and affixed to the closed end of the drum, the pivot being journaled in the support structure such that the drum and the housing conjoined form an enclosure, the drum and the housing each closing the other;

sensor means mounted on the support structure for generating a control signal representing an angular position of the drive lever of the foot-pedal assembly, the throttle controlling computer coupled to the sensor means whereby the control signal generated by the sensor means is monitored by the computer for controlling the engine throttle; and means disposed inside the enclosure for translating pivotal movement of the foot-pedal assembly to an input of the sensor means, the pivotal movement translating means comprising a rack on an interior wall of the drum and a pinion meshed with the rack and having a shaft journaled to the support structure, the shaft being coupled to the input of the sensor means.

11. In a throttle control system of a vehicle having an engine and a throttle controlling computer, a foot pedal arrangement providing input to the throttle controlling computer, the foot pedal arrangement comprising:

a pedal portion moveable through a first range of angular rotation and spring biased toward an idle extreme of said first range of angular rotation whereby upon urging of said pedal through said first range of angular rotation to a full throttle extreme of said first range of angular rotation said pedal returns under said spring bias to said idle extreme of said first range of angular rotation;

a sensor portion moveable through a second range of angular rotation substantially greater than said first range of angular rotation, an idle extreme of said second range of angular rotation corresponding to said idle extreme of said first range of angular rotation, a full throttle extreme of said second range of angular rotation corresponding to the full throttle extreme of said first range of angular rotation whereby coordinated movement of said sensor through said second range of angular rotation provides sensor output corresponding to pedal positioning within said first range of angular rotation; and a bi-directional pivotal translation mechanism coupling said pedal portion and said sensor portion whereby movement of said pedal portion from said idle extreme through said full throttle extreme of said first range of angular rotation moves by way of said mechanism said sensor portion from said idle extreme through said full throttle extreme of said second range of angular rotation, and further upon return of said pedal from said full throttle extreme to said idle extreme of said first range of angular rotation under said spring bias said mechanism moves said sensor portion from said full range extreme to said idle extreme of said second range of angular rotation.

12. In a throttle control system of a vehicle having an engine and a throttle controlling computer, a foot pedal arrangement providing input to the throttle controlling computer, the foot pedal arrangement comprising:

a pedal portion moveable through a first range of angular rotation and spring biased toward an idle extreme of said first range of angular rotation whereby upon urging of said pedal through said first range of angular rotation to a full throttle extreme of said first range of angular rotation said pedal returns under said spring bias to said idle extreme of said first range of angular rotation;

a sensor portion moveable through a second range of angular rotation substantially greater than said first range of angular rotation, an idle extreme of said second range of angular rotation corresponding to said idle extreme of said first range of angular rotation, a full throttle extreme of said second range of angular rotation corresponding to the full throttle extreme of said first range of angular rotation whereby coordinated movement of said sensor through said second range of angular rotation provides sensor output corresponding to pedal positioning within said first range of angular rotation; and a pivotal translation mechanism coupling said pedal portion and said sensor portion whereby movement of said pedal portion from said idle extreme through said full throttle extreme of said first range of angular rotation moves said sensor portion from said idle extreme through said full throttle extreme of said second range of angular rotation, and further upon return of said pedal from said full throttle extreme to said idle extreme of said first range of angular rotation under said spring bias said coupling moves said sensor portion from said full range extreme to said idle extreme of said second range of angular rotation, said coupling mechanism comprising a rack-and-pinion gearing.

* * * * *

UNITED STATES PATENT AND TRADEMARK OFFICE
CERTIFICATE OF CORRECTION

PATENT NO. : 5,241,936
DATED : Sep. 7, 1993
INVENTOR(S) : Byler, et al

It is certified that error appears in the above-indentified patent and that said Letters Patent is hereby corrected as shown below:

Col. 8, line 29, after "of", insert --the drive lever, a drum normal to the drive lever at a proximal end--.

Signed and Sealed this

Nineteenth Day of April, 1994

Attest:

BRUCE LEHMAN

Attesting Officer *Commissioner of Patents and Trademarks*